UNITED STATES PATENT OFFICE.

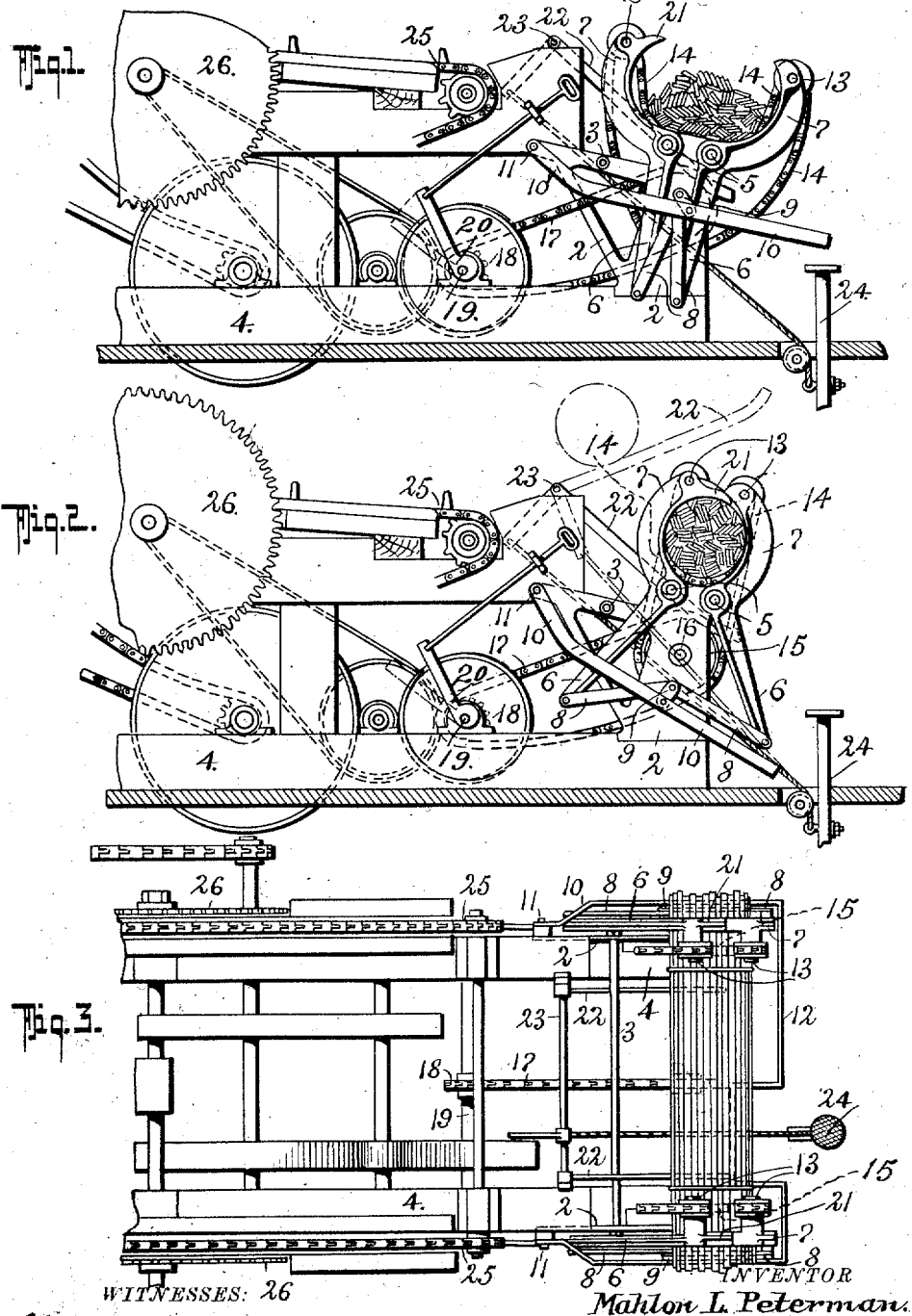

MAHLON L. PETERMAN, OF MILLSIDE, BRITISH COLUMBIA, CANADA.

LATH-BUNDLER.

987,740.     Specification of Letters Patent.     Patented Mar. 28, 1911.

Application filed June 8, 1910. Serial No. 565,832.

*To all whom it may concern:*

Be it known that I, MAHLON L. PETERMAN, a citizen of the United States of America, residing at Millside, in the Province of British Columbia, Canada, have invented a new and useful Lath-Bundler, of which the following is a specification.

This invention relates to a machine for bundling laths and is designed to receive the laths as they come from the stripper and roll them tightly into compact bundles in which they are held while being tied, to be thereafter passed to the trimming saws and cut to the required uniform length. This object is attained by depositing an armful of cut laths upon two endless moving chains the loop ends of which, while the chains are moving, brought together to surround the bundle of laths, and by so inclosing them the laths are tightly rolled together within the moving chains into a compact cylindrical bundle which is then tied and passed by means of a carrier between two circular saws to be trimmed to length.

The invention is fully described in the following specification, reference being made to the drawings by which it is accompanied, in which:

Figure 1 is a side elevation showing the arms of the machine in the open position as for the reception of the laths to be bundled, Fig. 2, a similar view showing the arms closed as in the act of bundling, and Fig. 3, a plan of the machine, in all of which views the bundling machine is shown as connected to the trimming saw frame.

In these drawings 2 represents side supporting frames which are secured the required distance apart, within the length of the laths, by a tie rod 3 and by attachment to the foundation timbers 4 which may also form the foundation of the trimming saws and the conveyer delivering to them.

On each side frame 2 is pivotally mounted at 5 a pair of opposed levers 6 the upper parts 7 of which are curved as drawn to conform approximately to the circle of the finished bundle. To the lower ends of these levers 6 on each side of the machine are pin-connected the outer ends of toggle links 8 the inner ends of which are similarly connected together and by a short link 9 to a treadle frame 10 which is fulcrumed at 11 to the side frames 2. This treadle frame 10 is carried across the front of the machine, as at 12, for the convenience of the operator.

Inwardly projecting from the upper ends of the curved portion 7 of the levers 6 are studs 13 on which are rotatable small flanged wheels over which on each side of the machine an endless chain 14 passes, as shown in Fig. 1.

The loop ends of these chains being supported on the small wheels on the ends of the arms 7, the chain hangs between them and on the upper bight an armful of cut laths may be deposited. The lower bight of the chain passes under and in engagement with a sprocket wheels 15, secured on a shaft 16 extending between the side frames 2 and rotatable in bearings therein. By means of these sprocket wheels the chains are driven and as the loop ends are brought together the laths are arranged into a compact cylindrical bundle.

The sprocket shaft 16 may be driven in any suitable manner but is here shown as driven by a chain 17 over a sprocket wheel 18 secured on a countershaft 19 on which is a friction or other clutch 20 which may conveniently be thrown in or out of action by the attendant.

To close the interspace between the loop ends of the chain the end of one of the arms 7 of each pair is carried beyond the chain wheel at its end, as at 21, and the curvature of the under side conforms to that of the finished bundle. The opposed arm is shaped to allow this projecting end 21 to pass under it. Thus when a bundle of laths is being formed and the loop ends of the chain 14 approach together during the latter part of the operation the space between the two loop ends is closed by the part 21 of the lever and the conformation of the circle is maintained.

It must be understood that the finished bundle of laths does not rotate in contact with the levers 7 but is carried in the chains except at that portion 21 and adjacent to it which completes the circle.

When the ends of 7 come together and the laths are compactly bundled the driving gear by which the chains are operated and therefore the bundle rotated, is thrown out of action, and, while still held tightly in the chains. the bundle is manually tied at each end with twine. The foot of the operator is then removed from the treadle 12 when the lever ends 6 close together and open the curved ends 7 to the position represented in Fig. 1.

Two arms 22 secured on a cross shaft 23 and extending under the bundle in the machine are then lifted up, as indicated by dot and dash lines in Fig. 2, by the operator pressing his foot upon a pedal 24. The bundle is thus lifted on these arms and rolls down them and is deposited on a chain conveyer 25 to be carried by it through between two trimming saws 26 by which the tied bundle is cut to the exact length required.

Having now particularly described my invention and the manner of its operation, I hereby declare that what I claim as new and desire to be protected in by Letters Patent, is:

1. In a machine for bundling laths or the like, an endless chain the loop ends of which are carried on supporting wheels or rollers, means for driving the chain, and means for bringing the loop supports together around the interplaced laths.

2. In a machine for bundling laths or the like, two or more endless chains the loop ends of which are carried on supports, means for driving the chain, means for closing the loop ends toward one another on the interplaced laths and means coöperative therewith for closing the space between the loop ends as they are brought together.

3. In a machine for bundling laths or the like, two endless chains the loop ends of which are carried on the upper ends of curved levers pivotally mounted on the side frames of the machine the end of one lever of each pair being carried beyond the chain support to close the space between the two loop ends as they are brought together, means for driving the chains, and means for forcing the upper ends of the levers together.

4. In a machine for bundling laths, opposed levers pivotally mounted on the side frame of the machine, endless chains carried on the upper ends of each pair of levers, means for driving said chains, toggle links connecting the lower ends of said levers and means for operating the toggle to open and close the upper ends of the levers.

5. In a machine for bundling laths, opposed levers, endless chains carried on the upper ends of the opposed levers, and means for forcing the upper ends of said levers together, said means including a toggle between each pair of levers.

6. In a machine for bundling laths, opposed levers curved to clear the bundle of laths, endless moving chains carried on the upper ends of the opposed levers and forming a sling for the laths, one each of a pair of said levers having a projecting end to project beyond the support for the moving chains and under the chain support of its opposed lever, the under side of said projecting portion being curved to approximate the curvature of the finished bundle.

7. In a machine for bundling laths, opposed levers, endless chains carried on the upper ends of the opposed levers, means for forcing the upper ends of said levers together, said means including a toggle between each pair of levers, a treadle and a link connecting said treadle with said toggle.

In testimony whereof I have signed my name to this specification in the presence of two subscribing witnesses.

MAHLON L. PETERMAN.

Witnesses:
ROWLAND BRITTAIN,
ALEXANDER SMITH.